(12) United States Patent
Hoche et al.

(10) Patent No.: US 11,052,529 B2
(45) Date of Patent: Jul. 6, 2021

(54) ELECTRICAL WORK APPARATUS HAVING VIBRATION DECOUPLING

(71) Applicant: Andreas Stihl AG & Co. KG, Waiblingen (DE)

(72) Inventors: Florian Hoche, Besigheim (DE); Johannes Menzel, Wernau (DE); Marc Schmid, Oppenweiler (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 169 days.

(21) Appl. No.: 15/912,308

(22) Filed: Mar. 5, 2018

(65) Prior Publication Data
US 2018/0250804 A1    Sep. 6, 2018

(30) Foreign Application Priority Data

Mar. 4, 2017 (DE) ...................... 10 2017 002 094.9

(51) Int. Cl.
*B25F 5/00* (2006.01)
*B27B 17/00* (2006.01)
*A01G 3/053* (2006.01)
*H01M 50/20* (2021.01)

(52) U.S. Cl.
CPC ............. *B25F 5/006* (2013.01); *A01G 3/053* (2013.01); *B27B 17/0033* (2013.01); *H01M 50/20* (2021.01)

(58) Field of Classification Search
CPC ..... B25F 5/006; A01G 3/053; B27B 17/0033; B27B 5/38; H01M 2/1016; F16F 15/00; F16F 15/04; B23D 47/005; B25G 1/01

USPC .................................. 173/162.1; 30/381–387
See application file for complete search history.

(56) References Cited

U.S. PATENT DOCUMENTS

| | | | |
|---|---|---|---|
| 5,692,574 A * | 12/1997 | Terada ................. | B25D 17/043 173/162.2 |
| 7,942,212 B2 | 5/2011 | Zimmermann | |
| 8,672,305 B2 * | 3/2014 | Wolf ....................... | B25F 5/006 173/162.2 |
| 9,713,880 B2 * | 7/2017 | Haneda ................... | B27B 17/00 |
| 2008/0184568 A1 * | 8/2008 | Gieske ...................... | B25F 5/02 30/383 |

(Continued)

FOREIGN PATENT DOCUMENTS

| | | |
|---|---|---|
| GB | 2432036 B | 1/2008 |
| GB | 2445238 A | 7/2008 |

*Primary Examiner* — Chelsea E Stinson
*Assistant Examiner* — Himchan Song
(74) *Attorney, Agent, or Firm* — Walter Ottesen, P.A.

(57) ABSTRACT

The invention relates to an electrical work apparatus including an apparatus housing having an electric motor for driving a work tool, a control unit for putting the electric motor into operation, a handle housing having at least one handle for guiding the work apparatus, and a receiving cavity, realized in the handle housing, having an insertion opening for a battery pack for operating the electric motor. For the purpose of decoupling the battery pack in respect of vibration, the handle housing, together with the receiving cavity for the battery pack, is decoupled from the apparatus housing via one and the same antivibration element. A vibration gap is realized between the apparatus housing and the handle housing, wherein the antivibration element at least partly bridges the vibration gap.

16 Claims, 4 Drawing Sheets

(56) References Cited

U.S. PATENT DOCUMENTS

| | | | |
|---|---|---|---|
| 2012/0066916 A1* | 3/2012 | Heinzelmann | B27B 17/00 30/381 |
| 2012/0171539 A1 | 7/2012 | Rejman et al. | |
| 2012/0324743 A1* | 12/2012 | Bergquist | B25F 5/02 30/381 |
| 2014/0318821 A1* | 10/2014 | Wyler | B25D 11/125 173/104 |
| 2015/0026988 A1* | 1/2015 | Kurzenberger | F16F 15/04 30/381 |
| 2015/0034349 A1* | 2/2015 | Proudlock | A01D 34/90 173/176 |
| 2015/0202764 A1* | 7/2015 | Roberts | B25D 17/24 173/162.2 |
| 2017/0008160 A1 | 1/2017 | Simma | |
| 2017/0144287 A1* | 5/2017 | Fischer | B25D 17/043 |
| 2017/0259452 A1* | 9/2017 | Kachi | B27B 17/00 |

\* cited by examiner

ELECTRICAL WORK APPARATUS HAVING VIBRATION DECOUPLING

CROSS REFERENCE TO RELATED APPLICATION

This application claims priority of German patent application no. 10 2017 002 094.9, filed Mar. 4, 2017, the entire content of which is incorporated herein by reference.

FIELD OF THE INVENTION

The invention relates to an electrical work apparatus including an apparatus housing having an electric motor for driving a work tool, wherein a control unit is provided for putting the electric motor into operation. The work apparatus has a handle housing that has at least one handle for carrying and/or guiding the work apparatus, wherein realized in the handle housing there is a receiving cavity having an insertion opening for a battery pack, which is used for operating the electric motor. The battery pack is held in an exchangeable manner in the receiving cavity.

BACKGROUND OF THE INVENTION

An electrical work apparatus is known from US 2012/0171539. This known work apparatus includes a damping unit, which is configured to support the battery pack in a vibration-damped manner. If the battery pack is supported at one end by a first damping element and—beyond a contact strip—at another end via a second damping element, then relative movements, which may result in increased mechanical wear of the contacts or in breakage thereof, may occur between the contact strip and the battery pack.

SUMMARY OF THE INVENTION

It is an object of the invention to provide an electric work apparatus in such a manner that a relative movement between the battery pack and its associated contact strip is avoided.

According to an aspect of the invention, for the purpose of vibration decoupling, the handle housing, together with the receiving cavity for the battery pack, is decoupled from the apparatus housing via one and the same antivibration element.

For this purpose, a vibration gap is realized between the apparatus housing and the handle housing, wherein the antivibration element at least partly bridges the vibration gap between the handle housing and the apparatus housing. The vibration gap defines a prescribed distance between the handle housing and the apparatus housing, such that the handle housing and the apparatus housing can move relative to each other. The vibration gap need not be completely filled by the antivibration element; at least one location, the antivibration element only has to bridge the distance of the vibration gap.

Since the receiving cavity for the battery pack is realized in the handle housing and, together with the latter, is decoupled in respect of vibration via the antivibration element, a battery pack inserted in the receiving cavity is likewise decoupled in respect of vibration. On the one hand the handle can be decoupled in respect of vibration for the user, and on the other hand the battery pack can be decoupled in respect of vibration inside the handle housing, via one and the same antivibration element arranged in the vibration gap.

If antivibration elements are arranged at a plurality of locations in the vibration gap, this constitutes a parallel connection of antivibration elements in the vibration gap. Additional antivibration elements arranged beyond the vibration gap, for example between the receiving cavity and the handle housing and/or between the battery pack and the receiving cavity, constitute a series connection of antivibration elements. According to the invention, at least one antivibration element is provided, which decouples both the battery pack and the handle housing from the vibrations of the apparatus housing.

Further series-connected antivibration elements may also be provided beyond the vibration gap, which act in addition to the antivibration element provided in the vibration gap.

Expediently, no further antivibration elements are connected in series between the apparatus housing and the battery pack and/or between the apparatus housing and the handle housing in addition to the at least one antivibration element arranged in the vibration gap. In particular, no further antivibration elements are provided between the battery pack and the receiving cavity.

Owing to the configuration according to the invention, the battery pack can be held rigidly in the receiving cavity, with the result that relative movements between the battery pack, its contacts and a contact strip assigned to the battery pack can reliably be avoided. During operation, relative movements will not occur, either between the battery pack and the receiving cavity, or between the handle housing and the contact strip in the receiving cavity. In particular, during operation no relative movements occur between the handle housing and the contacts of the battery pack. The battery pack, together with the handle housing, forms a common mass system that can vibrate relative to the apparatus housing. The apparatus housing is decoupled in respect of vibration from the handle housing.

Advantageously, the receiving cavity and at least one handle form a common handle housing, fixedly connected to each other. According to the invention, the vibration decoupling of the battery pack is effected via the antivibration element of the handle.

An expedient arrangement is obtained if the longitudinal central axis of the receiving cavity is at an angle in relation to a longitudinal axis of the work apparatus. Advantageously, this angle is 70 to 110°. In particular, the longitudinal central axis of the receiving cavity is at right angles in relation to the longitudinal axis.

It may also be expedient for the longitudinal central axis of the receiving cavity to be arranged parallel to or in the direction of the longitudinal axis of the work apparatus. Such a configuration is advantageous for a work apparatus having a guide tube between the apparatus housing and the handle housing.

Advantageously, the exchangeable arrangement of the battery pack in the receiving cavity is formed by a separable snap-in latch.

An elastic material block has proved advantageous as an antivibration element. An antivibration element may be realized, in particular, in a rotationally symmetrical manner. The rotationally symmetrical antivibration element bridges the gap between the surfaces delimiting the vibration gap, and otherwise does not completely fill the vibration gap widthwise and lengthwise. The antivibration element preferably acts on a relatively small surface area in the vibration gap, and thus in the widest sense acts in a localized manner. Advantageously, the antivibration element is realized as a spring. In particular, realization as a steel spring is advantageous.

The handle housing may be equipped with two handles. Advantageously, the handle housing has a rear handle that is distal from the work tool, and a front handle that is proximal to the work tool. This arrangement of handles makes it easy to guide and/or carry the work apparatus.

In an embodiment of the invention, the work apparatus has a front end and a rear end, wherein the work tool is arranged at the front end, and the insertion opening of the receiving cavity lies open toward the rear end of the work apparatus.

In an advantageous embodiment of the invention, energy is supplied to the electric motor via electric leads, wherein the electric leads are run, in particular, as individual leads. The individual leads are spaced at a distance from each other, and bridge the vibration gap at differing locations.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
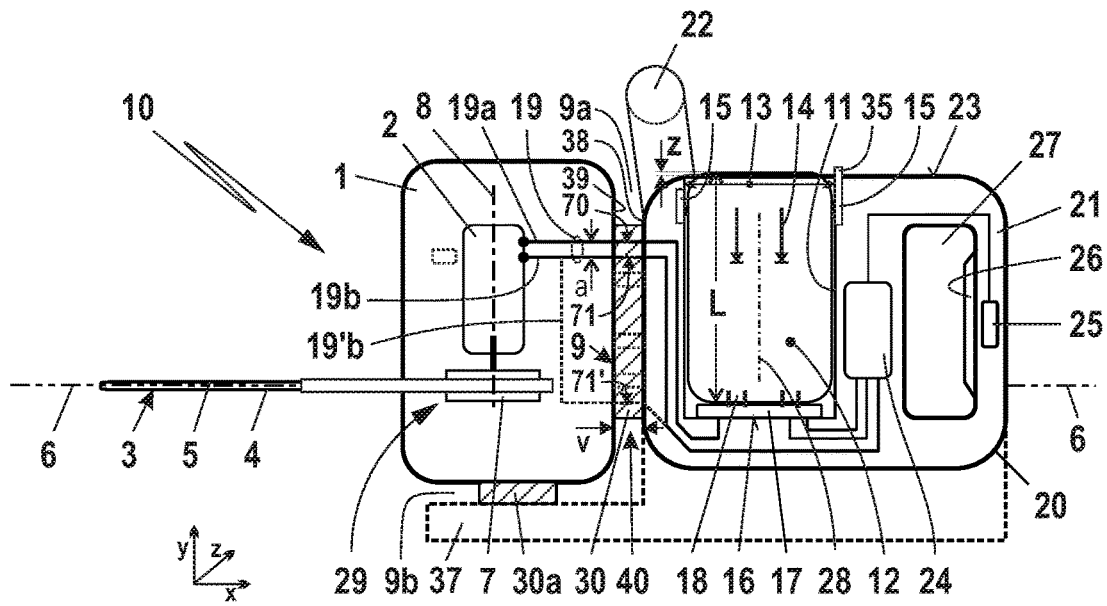
FIG. 1 is a schematic representation of an electrical work apparatus according to the principle of a hedge cutter.

The electrical work apparatus 10 represented schematically in FIG. 1 includes an apparatus housing 1, having an electric motor 2 for driving a work tool 3.

In the embodiment according to FIG. 1, the work apparatus 10 is realized as a hedge cutter, having a work tool 3 composed of cutter bars 4, 5 that move back and forth relative to each other. The drive element 7 for driving the work tool 3 is realized as an eccentric or crank drive. A transmission and/or a clutch may be arranged in the drive connection between the drive element, driving the work tool 3, and the electric motor 2. The schematically represented work apparatus 10 exemplarily represents an embodiment of a compact work apparatus without a guide tube such as, for example, a power saw, an angle grinder or the schematically represented hedge cutter.

The work apparatus 10 has a longitudinal axis 6, which lies in a work-tool plane defined by the work tool 3 and which runs in the direction of greatest extent of the work apparatus 10. The rotational axis 8 of the electric motor 2 is perpendicular, or at right angles, to the longitudinal axis 6 of the work apparatus 10. In particular, the rotational axis 8 of the electric motor 2 is perpendicular to the work-tool plane.

The electrical work apparatus 10 has a handle housing 20, on which at least one handle 21 or 22 is provided. The handles 21, 22 are used for guiding and/or carrying the work apparatus 10. The handle housing 20 has a rear handle 21 that is distal from the work tool 3, and a front handle 22 that is proximal to the work tool 3.

Realized in the handle housing 20 is a receiving cavity 11 for a battery pack 12, which is provided for operating the electric motor 2. On a side surface 23 of the handle housing 20, the receiving cavity 11 has an insertion opening 13, via which the battery pack 12 is inserted in the receiving cavity 11, in the arrow direction 14. The battery pack 12 is accommodated substantially over its entire length L in the receiving cavity 11; it may be expedient if the battery pack projects by a dimension z out from the insertion opening 13. The projecting end of the battery pack 12 projects over the side surface 23 of the handle housing 20.

The battery pack 12 is held in an exchangeable manner in the receiving cavity 11 and, in its operating position shown in FIG. 1, is held in a latched manner via a snap-in latch 15. The snap-in latch 15 has an unlatching element 35, upon depression of which the latching elements of the snap-in latch 15 release the battery pack 12, such that the latter can be removed from the receiving cavity 11, contrary to the arrow direction 14.

Arranged at the base 16 of the receiving cavity 11 is a contact strip 17, which makes an electrical connection to contacts 18 of the battery pack 12. It may also be advantageous to provide the contact strip 17 on the circumference of the receiving cavity 11. The electric motor 2 is connected, via the contact strip 17 and a control unit 24, via electric leads 19a, 19b. The control unit 24 is advantageously located in the handle housing 20 and, via the vibration gap 9, is decoupled from the vibrations of the apparatus housing 1. It may be expedient to run the electric leads 19a, 19b as a common lead wire 19. Preferably, the electric leads 19a, 19b are each run as an individual lead; in particular, the individual electric leads 19a, 19b bridge the vibration gap 9 at differing locations 70, 71. As a result of the individual leads 19a, 19b being run at differing locations 70, 71 of the vibration gap 9, the individual leads 19a, 19b are at a distance a from one another. The electric leads 19a, 19b cannot be supported against each other, thereby rendering the overall system less rigid. Less vibration is transmitted.

Since the leads 19a, 19b are routed over the vibration gap 9 at differing locations 70, 71, the stiffness of an individual lead 19a, 19b can be distributed to differing vibration forms, for example, in the case of differing rotational speeds.

It may be advantageous to make the distance a very large, as shown by the lead 19'b represented by the broken line, which crosses the vibration gap 9 at the location 71'.

Assigned to the control unit 24 is an electric operating element 25, which may be realized as an electric switch, potentiometer, sensor or the like. In the embodiment shown, the electric operating element 25 is actuated by a mechanical button 26, which projects into a handle opening 27 of the handle 21.

The handle housing 20 and the apparatus housing 1 face toward each other with a respective surface 38, 39, the two surfaces 38, 39 not contacting each other. The surfaces 38, 39 delimit a vibration gap 9 that has a height, a length and a width.

The height of the vibration gap 9 denotes the distance between the surfaces 38, 39. The length and width of the vibration gap 9 together denote the surface area of the mutually facing surfaces 38 and 39 separated at a distance from each other. The vibration gap 9 has at least two vibration-gap portions 9a, 9b, in which the height is measured in differing directions, that is, the vibration gap 9 extends three-dimensionally. The vibration gap 9 does not lie in a single plane, but extends at least along two differing planes arranged at an angle in relation to each other. The handle housing 20 may thus have an extension arm 37 to beneath the apparatus housing 1, and a further antivibration element 30a may be arranged in the vibration-gap portion 9b between the extension arm 37 and the apparatus housing 1. The vibration gap portions 9a, 9b are represented schematically in their configuration; in the schematically represented position, the vibration-gap portions 9a, 9b are exemplarily at right angles to one another.

The apparatus housing 1 and the handle housing 20 are connected to each other via an antivibration element 30. The antivibration element 30 bridges the vibration gap 9 realized between the apparatus housing 1 and the handle housing 20. Between the apparatus housing 1 and the handle housing 20, the vibration gap 9 affords a distance v. Owing to this distance v of the vibration gap 9, the apparatus housing 1 can move and vibrate relate to the handle housing 20 without coming into mechanical contact with the handle housing 20. The electric leads 19a, 19b are run, as individual leads or as a common lead wire 19, to the electric motor 2 in the apparatus housing 1, and bridge the vibration gap 9.

During operation, the apparatus housing 1 is excited to vibration. The excitation to vibration is effected, in particular, by the work tool 3 interacting with the material being cut, and is transmitted to the apparatus housing 1. Resonances in the drive train may also result in the apparatus housing 1 being excited to vibration.

One and the same antivibration element 30 thus decouples the handle housing 20 from the vibrations of the apparatus housing 1, with vibration decoupling of the battery pack 12 from the drive arranged in the apparatus housing 1 being achieved at the same time. The handle housing 20, together with the receiving cavity 11—and a battery pack 12 arranged therein—is decoupled from the apparatus housing 1, and the drive 29 arranged herein, via one and the same antivibration element 30. The vibration gap 9 between the handle housing 20 and the apparatus housing 1 is bridged by the antivibration element 30. The antivibration element 30, with its length, bridges the height of the vibration gap 9, that is, the distance v between the apparatus housing 1 and the handle housing 20. The width of the antivibration element 30 is in particular less, by a multiple, than the length and/or width of the vibration gap 9. In a preferred embodiment, the vibration gap 9 is bridged only in a localized manner by the antivibration element 30. The localized bridging of the vibration gap 9 is advantageous for an effective decoupling. A planar connection of the elements delimiting the vibration gap results in an excessively stiff connection. If a plurality of antivibration elements 30 are arranged in the vibration gap 9, non-bridged regions of the vibration gap 9 remain.

The antivibration element 30 is preferably realized so as to be rotationally symmetrical. The antivibration element 30 is arranged locally in the vibration gap 9 and extends, in particular, along the vibration gap 9, not over the entire vibration gap 9. The arranged antivibration element 30 is effective over the entire vibration gap 9.

The battery pack 12 is held rigidly in the receiving cavity 11, in particular held in a latched manner by the snap-in latch 15. Neither the latching nor the contacting via the contacts 18 and the contact strip 17 are subjected to vibration stress; when the work apparatus 10 is in operation, no relative movements occur between the battery pack 12 and the receiving cavity 11.

The contact strip 17 is arranged in a rigid manner in the receiving cavity 11, in particular at the base 16 of the receiving cavity 11, such that, when the work apparatus 10 is in operation, no relative movements occur between the handle housing 20 and the contact strip 17 in the receiving cavity 11. It is thereby also ensured that, when the electrical work apparatus 10 is in operation, no relative movements occur between the handle housing 20 and the contacts 18 of the battery pack 12. The contacts 18 are not subjected to mechanical stressing by vibrations.

The battery pack 12 inserted in the receiving cavity 11, together with the handle housing 20, forms a common mass system, relative to which the apparatus housing 1 can vibrate freely. The vibration decoupling of the battery pack 12 in the handle housing 20 is effected via the antivibration element 30 of the handle housing 20 itself, or of the handles 21 and 22. The receiving cavity 11, together with at least one handle 21, forms a common fixedly, in particular rigidly, connected handle housing 20.

The configuration is such that there are no additional antivibration elements arranged between the handle housing 20 and the contacts 18 of the battery pack 12. No additional antivibration elements are provided between the housing of the battery pack 12 and the wall of the receiving cavity 11. The battery pack 12 is held rigidly in the receiving cavity 11, and forms a common structure together with the handle housing 20 and at least one handle 21.

The handle housing 20, realized with two handles 21 and 22 in the embodiment according to FIG. 1, is configured in such a manner that the rear handle 21 is at a greater distance from the work tool 3 than the front handle 22. The rear handle 21 forms a rear handle that is distal from the work tool 3, while the handle 22 forms a front handle that is proximal to the work tool 3.

In the embodiment according to FIG. 1, the insertion opening 13 of the receiving cavity 11 faces toward the front, upper, handle 21. The work apparatus 10 has a longitudinal central plane, which is vertical when in its storage position and which is determined by the rear handle 21. The direction of insertion of the battery pack 12 is parallel to the longitudinal central plane of the work apparatus 10, and in particular is at right angles to the longitudinal central axis 6.

Figure 2:
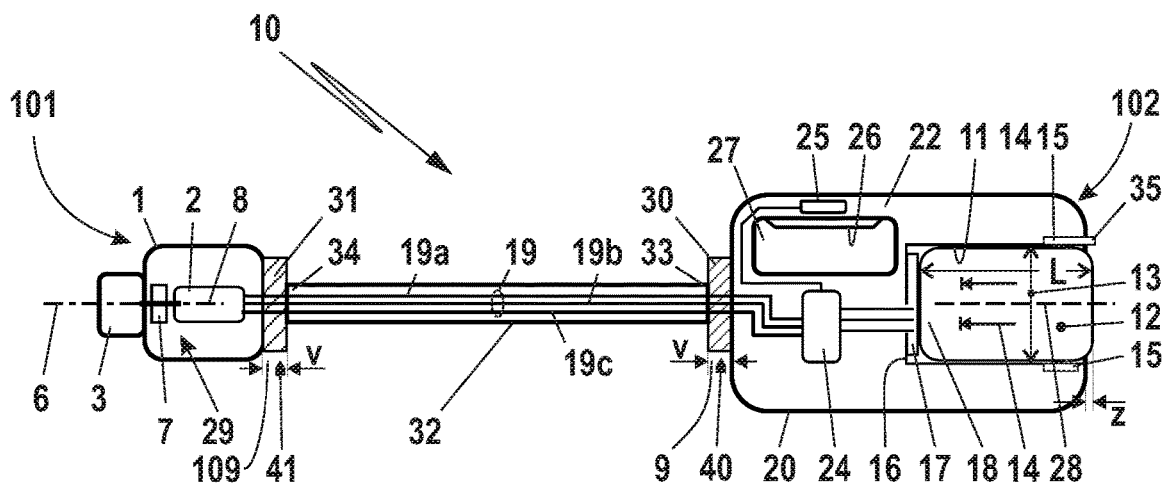
FIG. 2 is a schematic representation of an electrical work apparatus according to the principle of a brushcutter.

The electrical work apparatus 10 represented in FIG. 2 has a basic structure that is similar to that of the work apparatus 10 according to FIG. 1; parts that are the same are denoted by the same references.

The work apparatus 10 is constructed according to the principle of a brushcutter, pole pruner, hedge cutter or such a work apparatus 10, and has a guide tube 32. The guide tube 32 is arranged between the apparatus housing 1 and the handle housing 20, such that the work apparatus 10 has a front end 101 and a rear end 102. The work tool 3 is arranged at the front end 101. At the front end 101, the apparatus housing 1 is provided with the drive 29, composed of an electric motor 2 and a drive element 7 for the work tool 3.

A clutch and/or a transmission may be arranged in the drive connection between the work tool 3 and the electric motor 2.

In the embodiment according to FIG. 2, the handle housing 20 has a handle 22, realized on the handle housing 20, having a button 26, a sensor or suchlike element, which actuates an electrical operating element 25. The work apparatus 10 has a longitudinal central plane, lying in which are the guide tube 32 and the rotational axis 8 of the electric motor 2. The receiving cavity 11 for the battery pack 12 has a longitudinal central axis 28, which lies in the longitudinal central plane of the work apparatus 10. With the guide tube 32, the longitudinal central axis 28 encloses an angle of less than 10°; in particular, the longitudinal central axis 28 runs parallel to the guide tube 32. Insertion of the battery pack 12 is effected along the longitudinal central axis 28 of the receiving cavity 11, the insertion opening 13 in the embodiment according to FIG. 2 being arranged at the rear end 102 of the work apparatus 10, on a side that, during operation, usually faces rearward.

The handle housing 20 and the apparatus housing 1 are connected to each other via the guide tube 32 and at least one antivibration element 30, 31. A vibration gap 9, 109, realized at least between an end 33 of the guide tube 32 and the handle housing 20, or the apparatus housing 1 and the end 34 of the guide tube 32, is bridged by the at least one antivibration element 30, 31. The vibration gap 9, 109 may extend axially and/or radially on the guide tube 32.

Controlling of the electric motor 2 in the apparatus housing 1 is effected via the control unit 24, arranged in the handle housing 20, which on the one hand is connected to the contacts 18 of the battery pack 12 via the contact strip 17, and on the other hand is connected to the electrical operating element 25 that is to be operated by the user via the button 26. The lead wire 19 to the electric motor 2 in the apparatus housing 1 runs, through the guide tube 32, from the handle housing 20 to the apparatus housing 1. The electric lead wire 19 bridges the at least one vibration gap 9, 109.

The lead wire 19 in FIG. 2 includes three individual electric leads 19a, 19b and 19c, such as may be provided, preferably, for controlling an electronically commutated electric motor 2 (EC motor). It may be expedient to run the electric leads 19a, 19b and 19c as a common lead wire 19, as shown by a broken line in FIG. 2. Preferably, the electric leads 19a, 19b, 19c are each run as an individual lead. The individual leads 19a, 19b and 19c bridge the vibration gap 9, preferably at differing locations. As a result of the individual leads 19a, 19b, 19c being run at differing locations of the vibration gap 9, the individual leads 19a, 19b, 19c are spaced at a distance from each other. The electric leads 19a, 19b, 19c thus cannot be supported against each other, rendering the overall system less rigid. Less vibration is transmitted.

Figure 3:
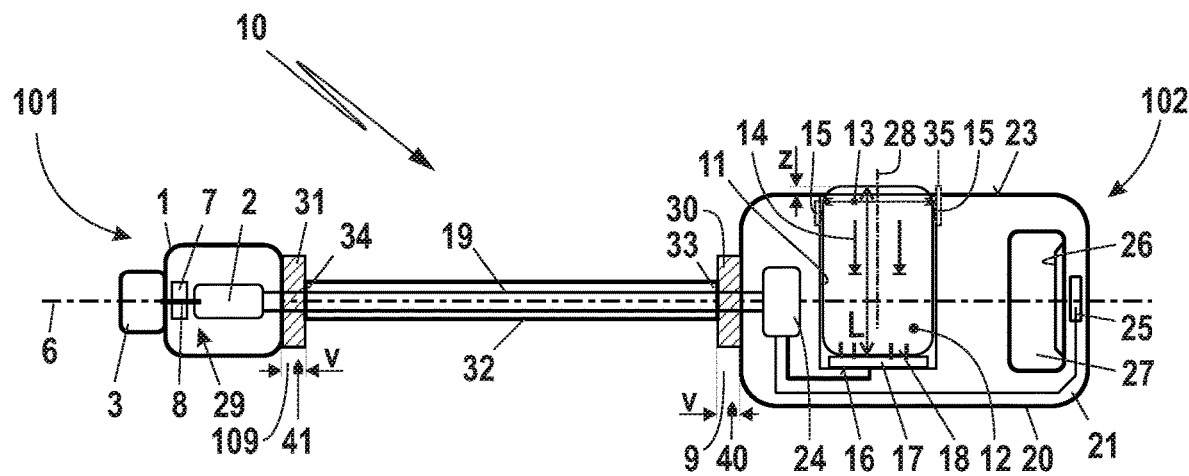
FIG. 3 is a schematic representation of a work apparatus according to FIG. 2, in a modified arrangement of the battery pack.

The embodiment according to FIG. 3 corresponds in essence to that according to FIG. 2, for which reason the same references are used for parts that are the same.

In the embodiment according to FIG. 3, a handle 21 is arranged behind the receiving cavity 11 for the battery pack 12, while in the embodiment according to FIG. 2 the receiving cavity forms the rear end 102 of the work apparatus 10.

The receiving cavity 11 for the battery pack 12 has a longitudinal central axis 28, which lies in the longitudinal central plane of the work apparatus 10 and, in particular, encloses an angle of between 80° and 110° with the guide tube 32. Insertion of the battery pack 12 is effected along the longitudinal central axis 28 of the receiving cavity 11, the insertion opening 13 in the embodiment according to FIG. 3 being arranged between the handle 21 and the guide tube 32, on a housing side that, during operation, usually faces upward.

Figure 4:
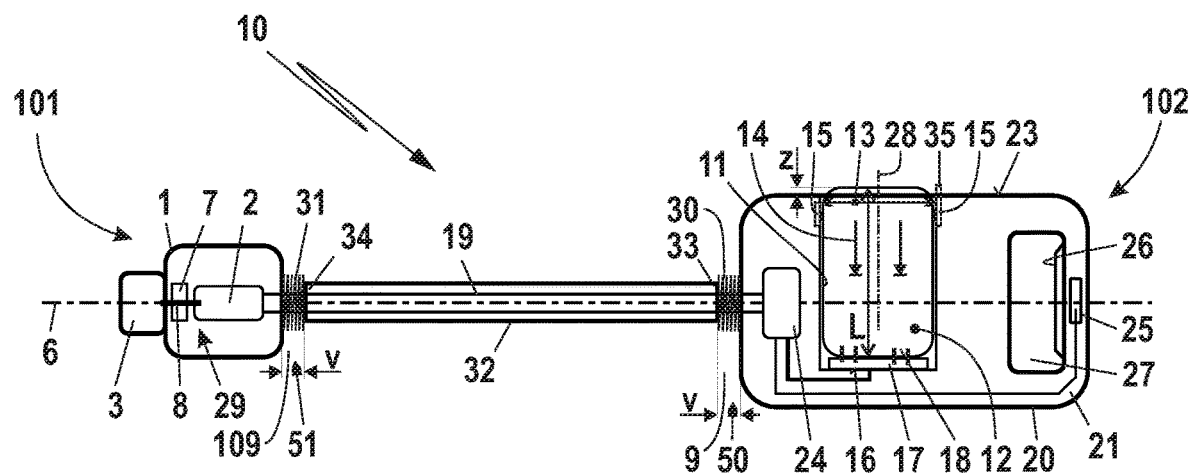
FIG. 4 is a schematic arrangement of a work apparatus according to FIG. 3, having antivibration elements realized as helical springs.

Owing to its material and/or its shape, the antivibration element 30, 31 may have elastic properties. The antivibration element 30, 31 may be realized, in particular, as a steel spring 50, 51 (FIG. 4) or as a molded part 40, 41 made of rubber or polyurethane foam. Advantageously, the antivibration elements 30, 31 are composed of rubber. Rubber damps the transmission of high-frequency vibrations.

Figure 5:
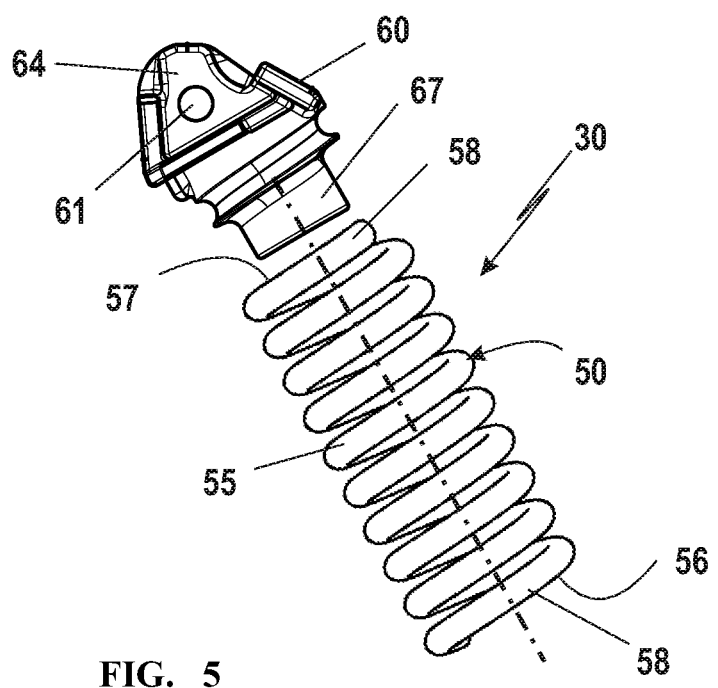
FIG. 5 is a schematic representation of an antivibration element in the form of a steel spring realized as a helical spring, having a plug for mounting.
Figure 6:
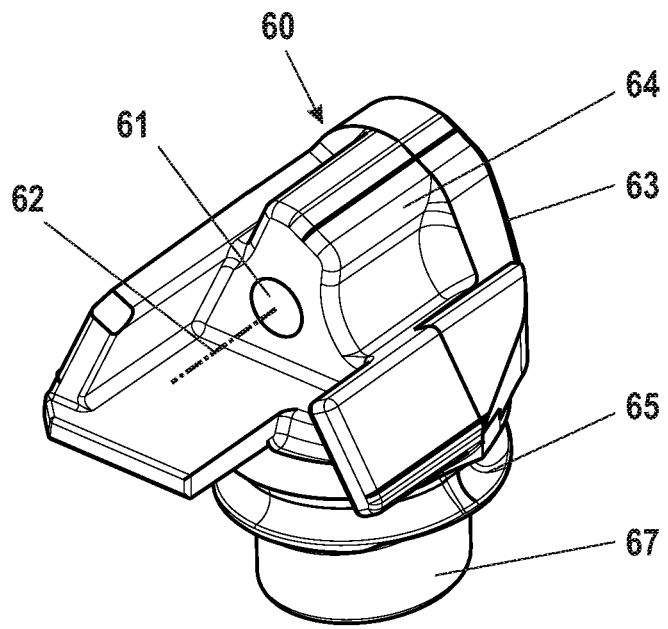
FIG. 6 is a perspective, schematic representation of the plug according to FIG. 5.

A realization of an antivibration element 30 is shown in FIG. 5. The steel spring 50 represented there is realized as a helical spring 55, and is held via plugs 60 screwed into the ends 56, 57 of the helical spring 55. For the purpose of mounting, one plug 60 is provided with a fastening opening 61 for the engagement of a fastening element 62. Such plugs are described in detail in U.S. Pat. No. 7,942,212 of the applicant, the disclosure of which is referred to expressly.

Figure 7:
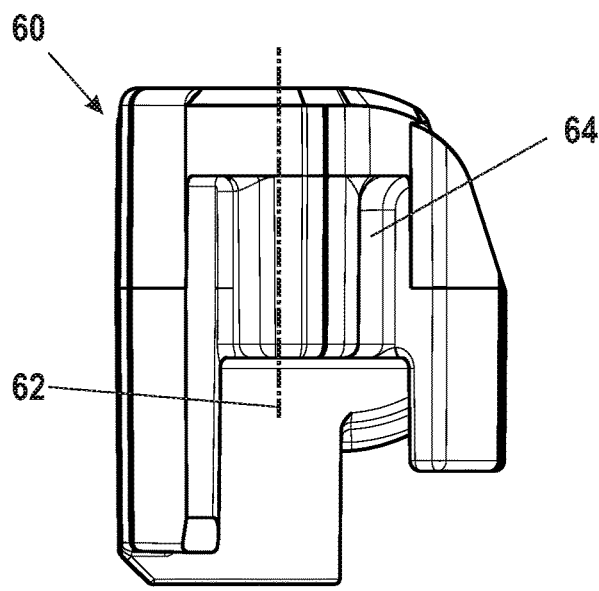
FIG. 7 is a top view of the plug according to FIG. 6.

A plug 60 for mounting a helical spring 55 as an antivibration element is composed of a base body 63 having a head 64, an axial dome 67 and a receptacle 65 for at least one coil 58 of the helical spring 55. The head 64, which is represented in a top view in FIG. 7, is shaped to match the fastening location. The head 64 has, in particular, a continuous fastening opening 61, through which a fastening element 62 engages.

Figure 8:
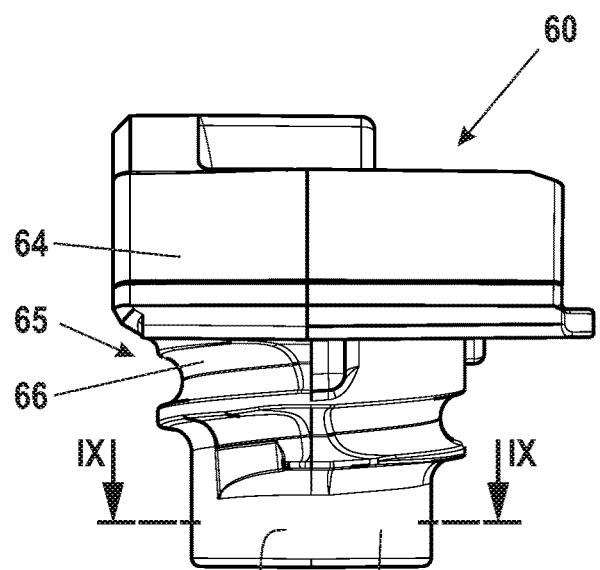
FIG. 8 is a side view of the plug according to FIG. 6.

As can also be seen from the side view according to FIG. 8, the helical spring 55 is held, by somewhat more than one of its final coils 58, in a thread run 66 of the receptacle 65 of the plug 60. The thread run 66 is realized at one end of the axial dome 67 of the plug 60. The dome 67 of the base body 63 projects axially into an end 57 of the helical spring 55.

Figure 9:
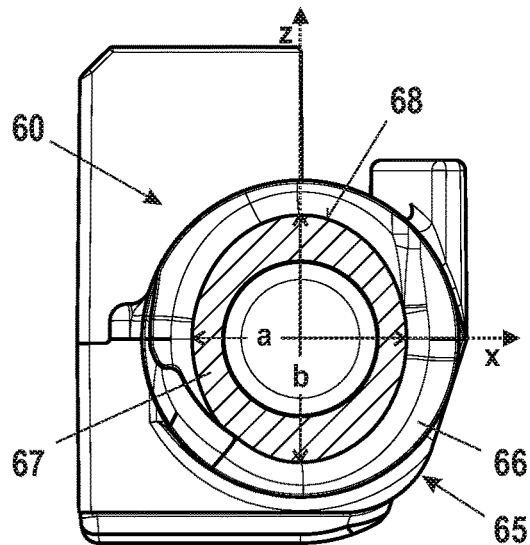
FIG. 9 is a section along the line XI-XI in FIG. 8.

FIG. 9 shows a section through the axial dome 67. As shown therein, the outer diameter of the dome 67 is of an elliptical shape, such that the dome 67 has a lesser extent in an x direction than in a z direction. In the embodiment shown according to FIG. 9, a small half-axis a of the elliptical cross section lies in the x direction; the large half-axis B of the elliptical cross section extends in the z direction.

Upon transverse deflection of the helical spring 55, the outer surface 68 of the axial dome 67 forms a stop surface for the coils of the spring.

If the helical spring according to the representation in FIG. 9 is deflected in the x direction, then substantially the spring stiffness characteristic of the helical spring 55 is effective. If, on the other hand, the helical spring 55 is deflected in the z direction, then, after an already small deflection, at least one coil of the helical spring 55, in the region of the large half-axis b, will bear against the outer surface 68, as a stop surface of the deflection. As a result of bearing against the outer surface 68, a characteristic differing from the original linear spring stiffness characteristic of the helical spring 55 is achieved. In the z direction, the helical spring 55 bears against the outer surface 68 after only a slight transverse deflection, and thereby becomes stiffer after bearing against it. In the region of the small half-axis a, the helical spring 55 is at a greater distance from the outer surface 68, as a result of which the spring stiffness is determined exclusively by the characteristic of the helical spring 55 itself.

Owing to the shape and configuration of the outer cross section of the engagement portion, the helical spring 55 can thus be configured so as to differ in stiffness in differing directions of deflection.

It is understood that the foregoing description is that of the preferred embodiments of the invention and that various changes and modifications may be made thereto without departing from the spirit and scope of the invention as defined in the appended claims.

What is claimed is:

1. An electrical work apparatus comprising:
a work tool;
an apparatus housing;
an electric motor mounted in said apparatus housing and configured to drive said work tool;
a control unit configured for starting said electric motor;
a handle housing having a back handle for guiding the electrical work apparatus;

said handle housing defining a receiving cavity having an insertion opening for a battery pack for operating said electric motor;

said receiving cavity being configured to hold the battery pack inside said handle housing in an exchangeable manner;

an antivibration element;

said handle housing together with said receiving cavity being decoupled from said apparatus housing via said antivibration element;

said apparatus housing and said handle housing conjointly defining a vibration gap therebetween;

said antivibration element being disposed so as to at least partially bridge said vibration gap between said housing apparatus and said handle housing;

said back handle being distal to said work tool;

said handle housing further including a front handle proximal to said work tool;

said back handle and said front handle conjointly defining a straight connecting reference line; and, said receiving cavity being disposed between said front handle and said back handle at least partially on said straight connecting reference line, wherein the battery pack is rigidly held in said receiving cavity.

2. The work apparatus of claim 1, wherein said receiving cavity is configured such that no relative movements between said receiving cavity and the battery pack occur during operation.

3. The work apparatus of claim 1 further comprising:
a contact strip disposed in said receiving cavity; and,
said contact strip and the battery pack configured such that no relative movements between said contact strip and the battery pack occur during operation.

4. The work apparatus of claim 1, wherein:
the battery pack has contacts; and,
the contacts and said handle housing are configured such that no relative movements between said handle housing and the contacts occur during operation.

5. The work apparatus of claim 1, wherein the battery pack and said handle housing are conjointly configured to vibrate as a common mass system relative to said apparatus housing.

6. The work apparatus of claim 1, wherein said antivibration element is configured to effect a vibration decoupling of the battery pack.

7. The work apparatus of claim 1, wherein said receiving cavity and said back handle form said handle housing which is a common, fixedly connected handle housing.

8. The work apparatus of claim 1, wherein:
the work apparatus defines a first longitudinal axis; and,
said receiving cavity defines a second longitudinal axis lying at an angle of 70° to 110° to said first longitudinal axis.

9. The work apparatus of claim 1, wherein:
the work apparatus defines a first longitudinal axis; and,
said receiving cavity defines a second longitudinal axis lying in said first longitudinal axis.

10. The work apparatus of claim 1, wherein the battery pack is held in said receiving cavity via a releasable snap-in latch.

11. The work apparatus of claim 1, wherein said antivibration element is an elastic molded part and at least partially bridges said vibration gap.

12. The work apparatus of claim 1, wherein said antivibration element is a spring.

13. The work apparatus of claim 1, wherein:
the work apparatus has a front end and a back end;
said work tool is arranged at said front end; and,
said insertion opening is open toward said back end of the work apparatus.

14. The work apparatus of claim 1 further comprising:
a plurality of electrical lines;
said electric motor being configured to receive energy via said electrical lines;
said electrical lines being run as individual lines; and,
said electrical lines bridging said vibration gap at a distance from each other at different locations of said vibration gap.

15. The work apparatus of claim 1, wherein said work tool defines a work tool plane.

16. The work apparatus of claim 1, wherein the battery pack has electrical contacts and said receiving cavity defines an insertion direction along which the battery pack is inserted thereinto;
said receiving cavity defines a bottom delimiting said receiving cavity in said insertion direction; and,
wherein said work apparatus further comprises a contact strip mounted on said bottom for electrically connecting to the electric contacts of the battery pack when the battery pack is inserted into said receiving cavity.

* * * * *

UNITED STATES PATENT AND TRADEMARK OFFICE
CERTIFICATE OF CORRECTION

Page 1 of 1

PATENT NO. : 11,052,529 B2
APPLICATION NO. : 15/912308
DATED : July 6, 2021
INVENTOR(S) : Hoche et al.

It is certified that error appears in the above-identified patent and that said Letters Patent is hereby corrected as shown below:

In the Specification

In Column 1:
Line 55: add -- at -- before "least".

In Column 5:
Line 18: delete "relate" and substitute -- relative -- therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*